United States Patent [19]

Suzuki

[11] Patent Number: 4,819,074

[45] Date of Patent: Apr. 4, 1989

[54] ELECTRONIC STILL CAMERA

[75] Inventor: Nobuo Suzuki, Yokohama, Japan

[73] Assignee: Kabushiki Kaisha Toshiba, Kawasaki, Japan

[21] Appl. No.: 31,460

[22] Filed: Mar. 30, 1987

[30] Foreign Application Priority Data

Mar. 31, 1986 [JP] Japan ................................. 61-73468

[51] Int. Cl.$^4$ ............................................. H04N 3/14
[52] U.S. Cl. .................. 358/209; 358/213.13; 250/578
[58] Field of Search .............. 358/209, 212, 213.13, 358/906, 909, 228; 354/432; 256/578; 307/311; 357/24 LR, 30

[56] References Cited

U.S. PATENT DOCUMENTS 3,934,161  1/1976  Caywood ............................ 307/311
4,489,350 12/1984  Kimura ........................... 358/213.13

Primary Examiner—L. T. Hix
Assistant Examiner—David M. Gray
Attorney, Agent, or Firm—Foley & Lardner, Schwartz, Jeffery, Schwaab, Mack, Blumenthal & Evans

[57] ABSTRACT

An electronic still camera is provided with a circuit for generating a charge signal corresponding to an object brightness, within a charge readout area of a solid state image sensor for generating an image signal. The shutter for closing the optical path of an optical system for focussing an object image on the solid state image sensor, is controlled based on the charge signal. Since a signal corresponding to the subject brightness can be correctly formed to control the shutter, a proper exposure can be ensured even if the object to be photographed moves or its brightness changes with time.

6 Claims, 5 Drawing Sheets

ELECTRONIC STILL CAMERA

BACKGROUND OF THE INVENTION

The present invention relates to an electronic still camera, and more particularly to an electronic still camera having an automatic exposure function.

In a conventional electronic still camera, an exposure time has been determined based on the information obtained by measuring the brightness of an object to be photographed with an exposure meter provided in the camera separately from its photographing system.

With such a camera, however, a proper exposure time cannot be obtained which correctly reflects a change in the brightness of the object, because the brightness information obtained by an exposure meter does not always represent that of the object when it is photographed. This is particularly the case if a subject brightness changes with time, if the object moves and is subject to brightness change, and so on.

SUMMARY OF THE INVENTION

An object of the present invention is to provide an electronic still camera capable of setting a proper exposure time which correctly reflects a change in the brightness of the object without the accopanying drawbacks described above.

According to this invention, there is provided an electronic still camera having a two-dimensional solid state image sensor composed of a light receiving area with photosensitive picture cells two-dimensionally arranged, and a charge readout area for reading a first charge signal generated at the light receiving area; an optical system for focusing an object image on the solid state image sensor; a shutter for opening an optical path of the optical system only at the time of photographing; and record means for recording an image signal of the object image obtained from the charge readout area; means provided within the charge readout area of the solid state image sensor, for generating a second charge signal corresponding to the object brightness; and shutter control means for closing the shutter based on an amount of the second charge signal while the shutter is open.

With an electronic still camera constructed as above, an object image is recorded in the light receiving area of a solid state image sensor, while on the other hand a charge signal corresponding to an object brightness is taken out from the charge readout area, integrated and compared with a predetermined threshold value to close the shutter. Therefore, the exposure time can be controlled in proportion to the light amount of an object image detected with photosensitive picture cells, thereby realizing a proper exposure time and substantially reducing photographing error even if the light amount of the object to be photographed changes with time.

BRIEF DESCRIPTION OF THE DRAWINGS

In the accompanying drawings.

DESCRIPTION OF THE PREFERRED EMBODIMENTS

Figure 1:
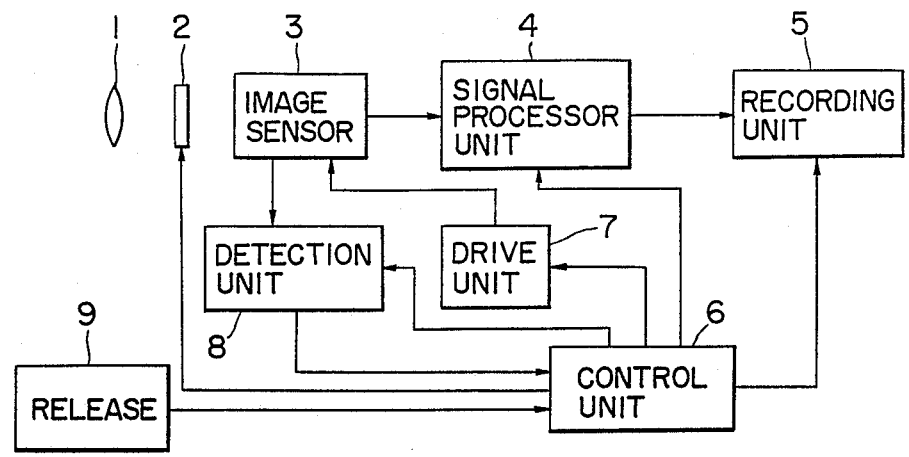
FIG. 1 is a block diagram showing the arrangement of an embodiment of an electronic still camera according to this invention.

FIG. 1 is a block diagram showing the outline of the construction of an electronic still camera according to the present invention.

In the Figure, an object image is projected onto an image sensor 3 by means of an optical system including a lens 1. A shutter 2 of the camera, which is opened and closed by a control unit 6 upon manipulation of a release 9, is interposed between the lens 1 and the image sensor 3. A charge signal stored in the image sensor upon reception of light is read by operating the charge transfer/readout means of the image sensor 3 through a drive circuit 7 under control of the control unit 6. The readout charge signal is converted into an image information in the form of scanning lines by a signal processor unit 4 to record the information in a recording unit 5.

Figure 2:
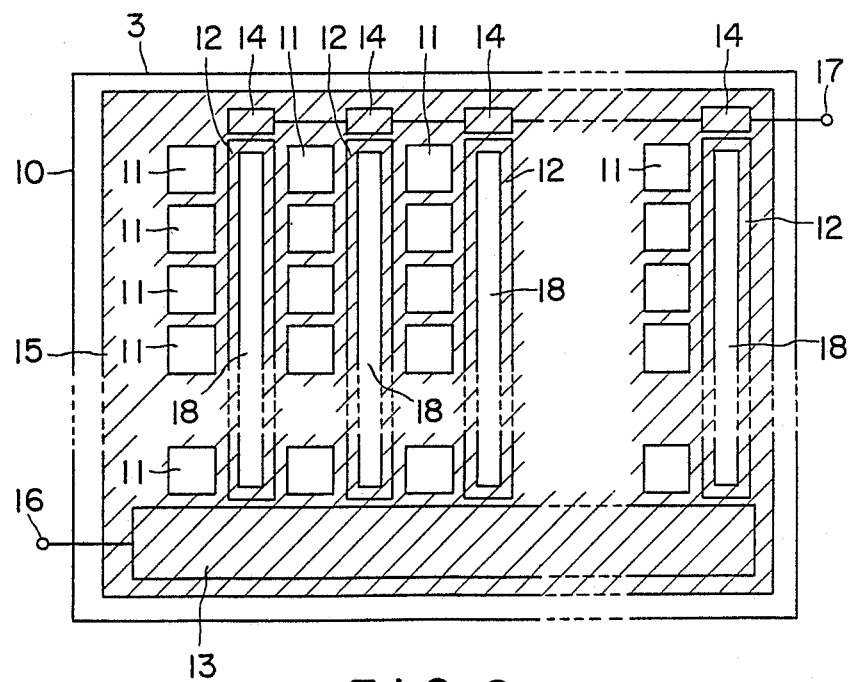
FIG. 2 is a plan view showing an exemplary layout of a solid state image sensor utilized in this invention.

FIG. 2 is a plan view showing the layout of a solid image sensor 3 utilized in the electronic still camera of this invention. The sensor 3 is a so-called interline transfer type charge coupled device (CCD) sensor having a matrix of photosensitive picture cells 11 disposed on a semiconductor substrate 10. Disposed between columns of the photosensitive picture cells 11 are buried channel type vertical CCD (VCCD) registers 12 of the four-phase driven type, at the lower end of which is disposed a horizontal CCD register 13 of the two-phase driven type to derive out the charge signal as an image signal from a terminal 16. Drain electrodes 14 are disposed at the upper ends of the VCCD registers 12 to derive out a charge signal from a terminal 17. A light shield film 15 is deposited on the surface of the sensor, with apertures 18 formed on the photosensitive picture cells 11 and the VCCD registers 12. Generally, a light shield film is formed on the VCCD registers 12 of an image sensor to prevent unnecessary charge generation. However, in this embodiment, apertures are formed on the VCCD registers 12 because incident light is allowed to impinge only during shutter opening and a charge signal at the vicinity of the photosensitive picture cells is to be detected.

Figure 3:
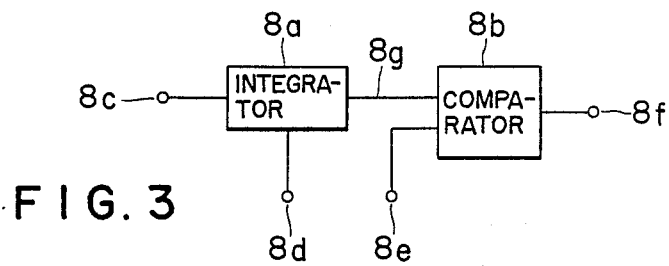
FIG. 3 is a block diagram showing the arrangement of a detection unit shown in FIG. 1.

A detection unit 8 is provided in the electronic still camera shown in FIG. 1, which is not included in a conventional camera as its constituent element. The detection unit 8 is used to pick up a signal representative of the object brightness during shutter opening and deliver the signal to the control unit 6, independently of an image information to be taken out from the image sensor 3. The detail of the detection unit 8 is shown in FIG. 3. As shown the detection unit 8 is provided with an integration circuit 8a having an input terminal 8c and an integration start control terminal 8d, and a comparator circuit 8b having an input terminal 8g supplied with the output of the integration circuit 8a, a reference voltage input terminal 8e, and an output terminal 8f. In the detection unit 8, a signal from the output terminal 17 of the image sensor 3 is applied to the input terminal 8c. When the signal becomes larger than a predetermined threshold level inputted to terminal 8e, a signal indicating this is outputted to the control unit 8 which then operates to close the shutter 2 to always obtain a proper exposure.

Figure 4:
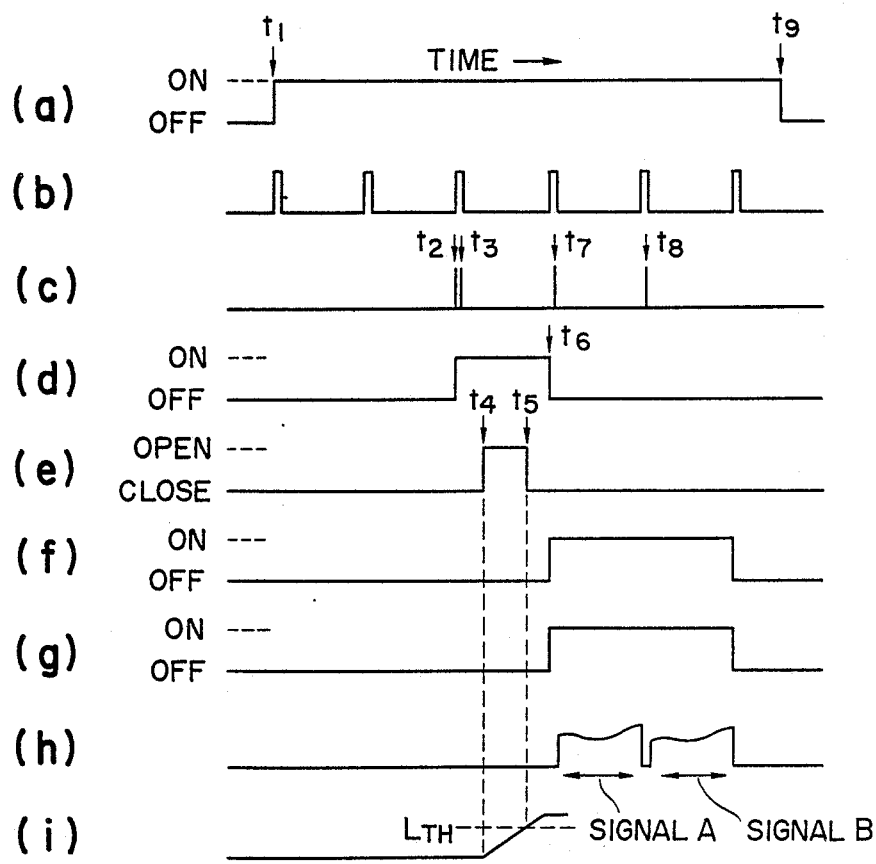
FIG. 4 is a timing chart showing the operation of the embodiment shown in FIGS. 1 and 2.

The control operation for the shutter using the image sensor as above will be described with reference to the timing chart shown in FIG. 4.

Upon turning on the release switch 9 at time t1, the power is supplied to the entire control system (FIG. 4(a)). Then, vertical synchronizing pulses are supplied to the automatic exposure device as shown in FIG. 4(b). The first two pulses are used to drain unnecessary charges such as various noise signals remained in the image sensor.

Next, at times t2 and t3 in a vertical blanking period, in which the vertical synchronizing pulse is in a high state, readout pulses are supplied (FIG. 4(c)). With these readout pulses, the last unnecessary residual charges in the photosensitive picture cells are transferred to the VCCD registers 12. In this case, an inverse transfer clock pulse is applied to the VCCD registers 12 to transfer the charges to the drains 14 (FIG. 4(d)). By this method, the unnecessary charges can be removed to the drains 14 within a very short time, for example, within 1 ms by using a high-frequency inverse transfer clock pulse, for example, higher than several hundreds KHz.

After the shutter 2 is opened at time t4, charge signals are generated in both the photosensitive picture cells 11 and the VCCD registers 12. The charge signals in the VCCD registers 12 are continuously derived out by the drain electrodes 14 because of an inverse transfer mode of the VCCD registers 12. In this case, a control pulse is applied to the control terminal 8d of the detection unit 8 connected to the terminal 17 to thereby reset an integration value to zero. After resetting, the detection unit 8 starts integration operation. The integrated value of the charge signals derived out from the VCCD registers 12 during the opening of the shutter 2 rises as shown in FIG. 4(i). When the integrated value reaches a threshold value $L_{TH}$ set in the detection unit 8 and representative of a most suitable exposure quantity, the detection unit 8 outputs an exposure complete signal to the control unit 6 so that the latter operates to close the shutter at time t5. The time required for transferring charges in the VCCD registers may become a detection delay time. However, it can be neglected substantially if the frequency of the inverse transfer pulse is set to be high.

During the charge readout of the VCCD 12 registers described above, charge signals representative of the image information of the object are being stored in the photosensitive picture cells.

Since charges accumulated in the VCCD registers 12 still remain at time t5 when the shutter is closed, inverse charge transfer continues up to time t6 when the next vertical synchronizing pulse rises.

Thereafter, two readout pulses are generated at times t7 and t8 respectively during vertical blanking periods of two vertical synchronizing pulses (FIG. 4(c)). Starting from time t7, the VCCD registers 12 are driven in a normal transfer mode (FIG. 4(f)) and the HCCD (horizontal CCD) 13 is also driven (FIG. 4(g)) to read the first field image information as signal A and the second field image information as signal B.

The image information is outputted from the output terminal 16 to be subjected to necessary processings such as A/D conversion at the signal processor unit 4 and thereafter, is recorded at the recording unit 5 on a recording medium such as a magnetic disk, a magnetic card, or the like.

After completion of the above described operation at time t9, the power supply is terminated at that time (FIG. 4(a)).

Figure 5:
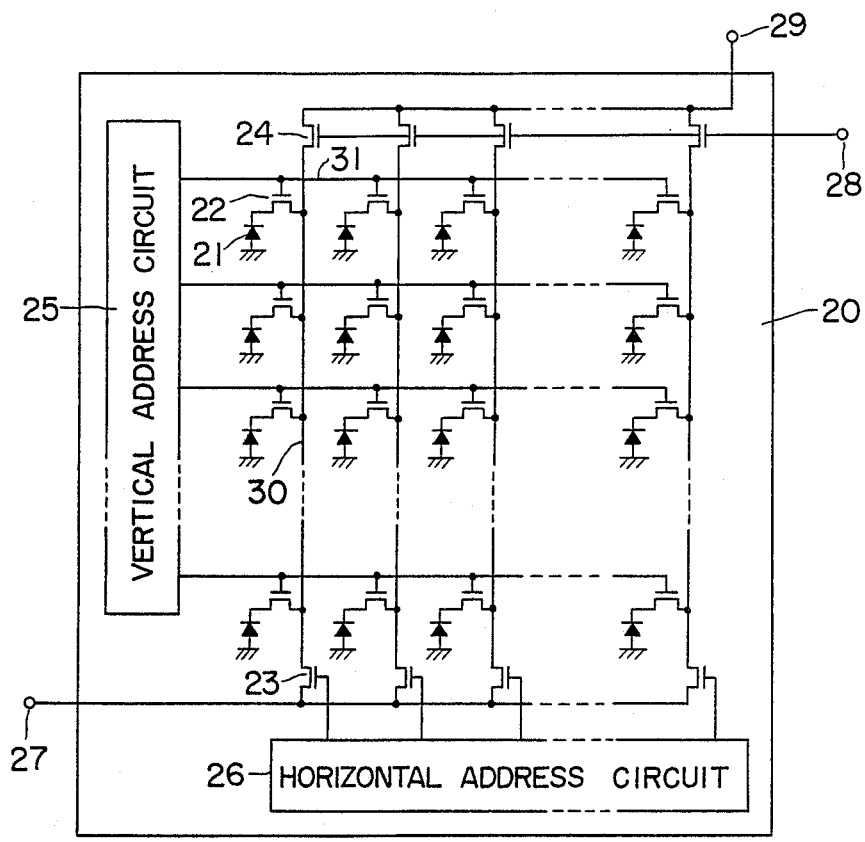
FIG. 5 is a schematic circuit diagram showing another example of a solid state image sensor.

FIG. 5 is a schematic circuit diagram showing another image sensor, or MOS type image sensor applicable to the present invention.

In the image sensor, p-n junction photodiodes 21 serving as photosensitive picture cells are disposed within a semiconductor substrate 20 in a matrix arrangement. Each diode is connected to a vertical drain line 30 which performs horizontal addressing via a vertical address MOS transistor 22 whose gate is connected to an address gate line 31 from a vertical address circuit 25. The vertical drain line 30 is selected by a horizontal scan MOS transistor 23 which is driven by a horizontal address circuit 26. A signal on the vertical drain line 30 can be derived out also from a terminal 29 via a control transistor 24 which is turned on by a gate input signal from a terminal 28.

Figure 6:
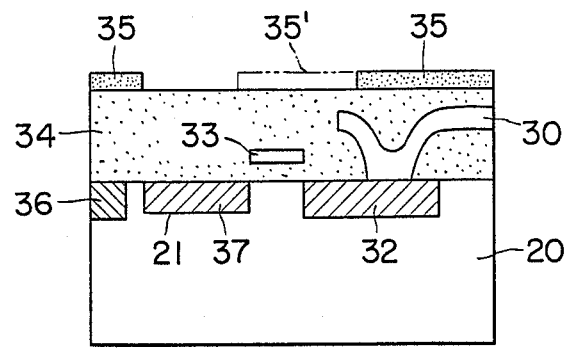
FIG. 6 is a sectional view illustrating the construction of the solid state image sensor shown in FIG. 5.

FIG. 6 is a sectional view showing a picture cell of the image sensor.

In the image sensor, $n^+$ source and drain regions 37 and 32 are formed in a P-type semiconductor substrate 20 at opposite sides of a gate electrode 33 which is formed over the surface of the substrate 20. A portion of the source region constitutes a photodiode 21 using a p-n junction together with the substrate. The drain region is connected to a vertical drain line 30 made of aluminum. On an insulation layer 34 formed over the substrate is formed, a light shield film 35 which has apertures 38 so as to receive light projected on the MOS transistor region and the photodiode region. In the case of a usual MOS image sensor, a light shield film 35 is extended to also shield the MOS transistor region as shown by 35'.

In this embodiment, charges generated by light incident upon the drain region of the MOS transistors can be taken out from the terminal 29 by turning off the MOS transistor 23 and turning on the transistor 24. In particular, the charges generated in the MOS transistors during the shutter opening and taken out from the terminal 29 under the above-noted conditions, are integrated at the detection unit and compared with a threshold value, to thereby enable to set an exposure time. In an ordinary readout operation for a charge signal, the transistor 24 is turned off.

In the above embodiments, the apertures for use in generating charges and setting an exposure time have been described as having similar configurations throughout the image sensor. However, the configuration of apertures may be changed at different locations so as to apply a weight to the light quantity.

Figure 7:
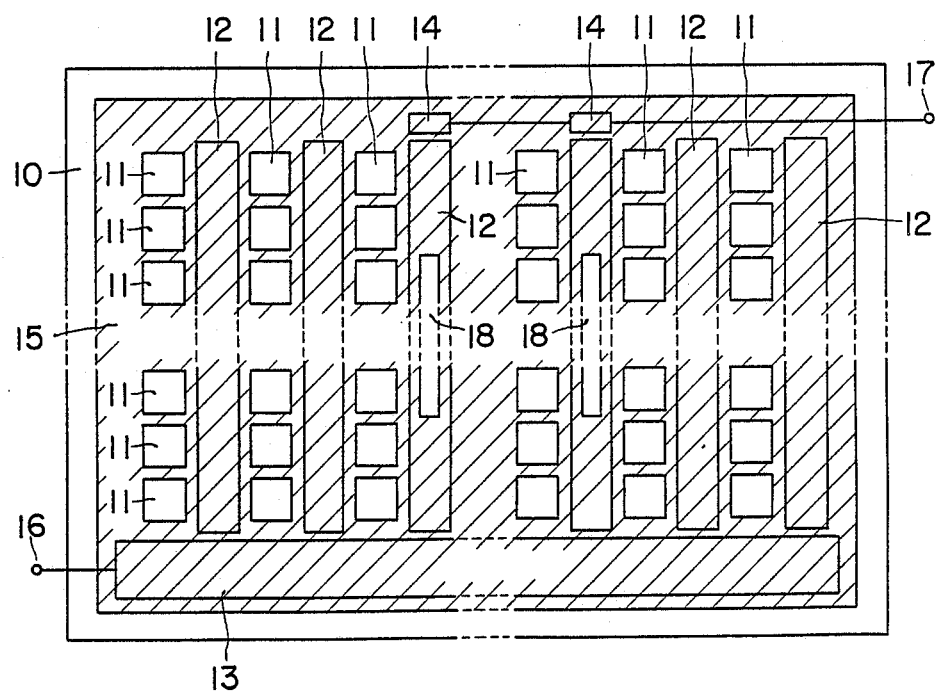
FIG. 7 is a plan view showing the layout of a solid state image sensor with apertures located differently from those of FIG. 2.

FIG. 7 is a plan view showing another embodiment of the present invention, wherein elements similar to those in FIG. 2 are designated by the same reference numerals. In this embodiment, an aperture is formed only at the middle portion of the vertical CCD register 12 while shielding the rest of the register. The drain electrodes 14 are formed in the extension of the aperture 18 of the vertical CCD register 12.

In this embodiment, an exposure time is determined based on the light quantity at the middle portion only.

To attain similar operation, the aperture outside of the middle portion may be made small.

In a case where the photosensitive picture cell area and the charge signal readout area have different spectral sensitivities, it is also possible to form on the aperture a color filter having the same spectral transmission or different mosaic pattern spectral transmission to obtain a desired spectral transmission characteristic.

Figure 8:
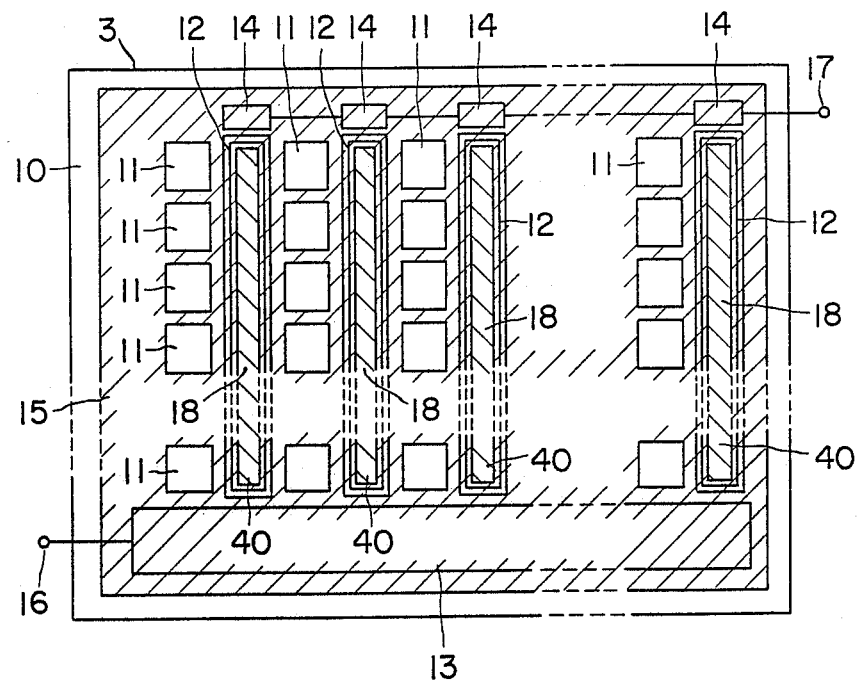
FIG. 8 is a plan view showing the layout of a solid state image sensor having a desired spectral transmittance characteristic.

FIG. 8 shows such an image sensor wherein a color filter 40, for example, green, and having a desired spectral transmission, is formed on the aperture 18 as used in the embodiment shown in FIG. 2. With this arrangement, the effect of polysilicon electrode, which absorbs blue light to a large extent, can be suppressed.

As an image sensor utilized in the present invention, any image sensor can be used so long as it allows independent drive of charge readout means for the photosensitive picture cells and for the areas adjacent to the picture cells. For instance, besides an interline transfer type CCD sensor, a line address type CCD sensor may be used. Further, although the detection unit has been provided separately from the image sensor in the above embodiments, it can be formed on the same substrate as of the image sensor.

What is claimed is:

1. An electronic still camera comprising:
   a two-dimensional solid state image sensor composed of a first charge signal generating means operating as light receiving means with photosensitive picture cells two-dimensionally arranged for generating a first charge signal, and a charge readout means for reading out the first charge signal generated at the first charge signal generating means;
   an optical system for focusing an object image on the solid state image sensor;
   a shutter for opening an optical path of the optical system only at the time of photographing;
   record means for recording an image signal of the object image obtained from the charge readout means;
   a second charge signal generating means for generating a second charge signal corresponding to an object brightness which is provided within the charge readout means; and
   shutter control means for closing the shutter on the basis of an amount of the second charge signal while the shutter is open.

2. An electronic still camera according to claim 1, wherein said second charge signal generating means comprises a charge transfer device on which is provided a light shielding film with apertures partially formed in said light shielding film, and a drain electrode for reading the second charge signal.

3. An electronic still camera according to claim 2, wherein said light shielding film has apertures whose configurations and sizes are non-uniform at their respective positions within the solid state image sensor so as to control the shutter mainly in accordance with light quantities at specified positions.

4. An electronic still camera according to claim 3, wherein said apertures are provided only at a middle part of the solid state image sensor.

5. An electronic still camera according to claim 2, wherein the drain electrode is provided only for said charge transfer device having the aperture in the light shielding film.

6. An electronic still camera according to claim 1 wherein said shutter control means includes a detection unit for integrating a detected second charge signal quantity, and closing the shutter when an integrated value exceeds a predetermined threshold value.

* * * * *